C. F. SMYTH.
BALLOON VALVE.
APPLICATION FILED MAY 15, 1917.
1,266,338.
Patented May 14, 1918.
2 SHEETS—SHEET 1.
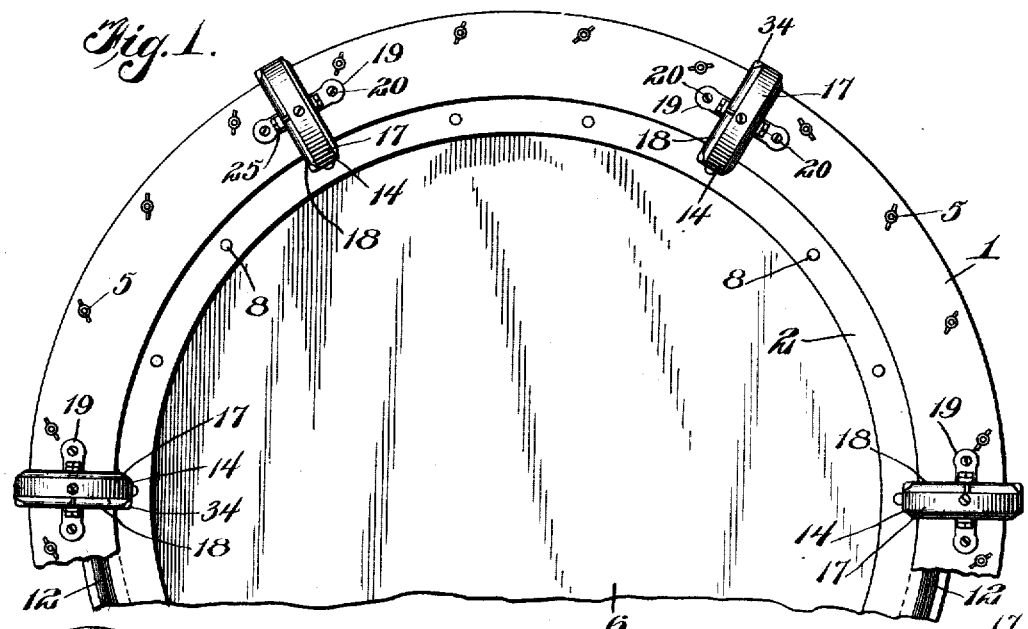
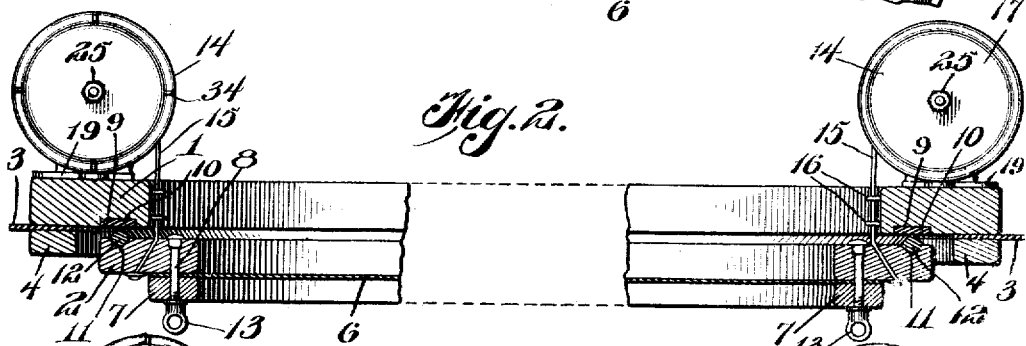
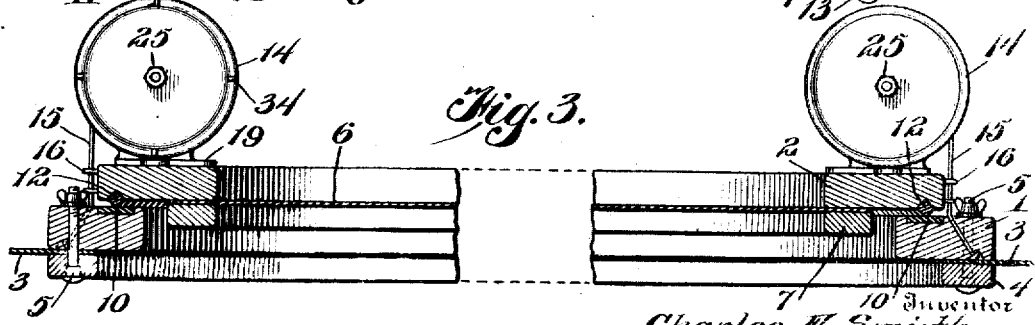
Witness
J. R. Heinrichs
Inventor
Charles F. Smyth
By
C. C. Hines
Attorney

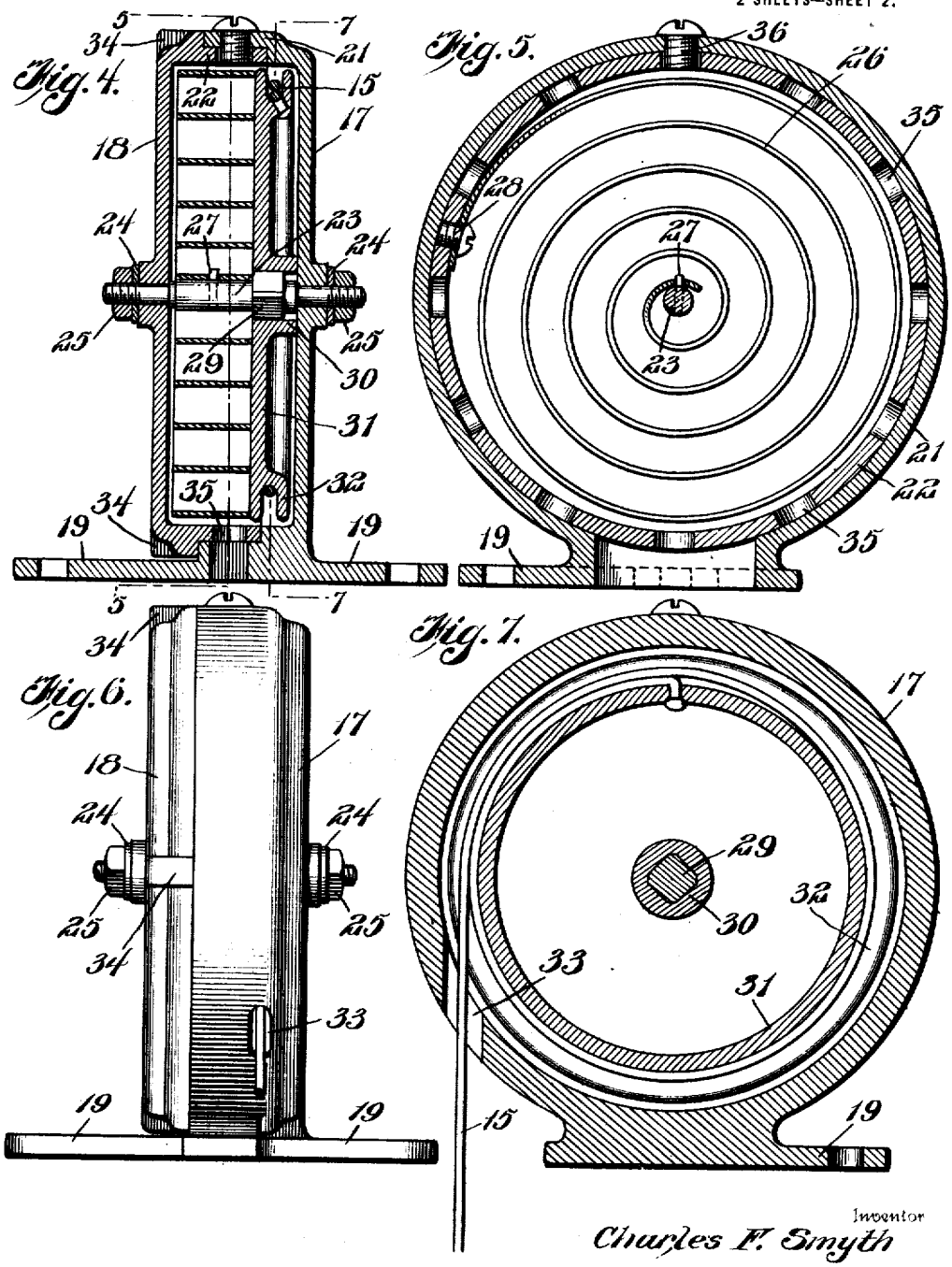

UNITED STATES PATENT OFFICE.

CHARLES FREDERICK SMYTH, OF NEW HAVEN, CONNECTICUT, ASSIGNOR TO CONNECTICUT AIRCRAFT COMPANY, OF NEW HAVEN, CONNECTICUT, A CORPORATION OF CONNECTICUT.

BALLOON-VALVE.

1,266,338.   Specification of Letters Patent.   Patented May 14, 1918.

Application filed May 15, 1917. Serial No. 168,764.

*To all whom it may concern:*

Be it known that I, CHARLES F. SMYTH, a citizen of the United States, residing at New Haven, in the county of New Haven and State of Connecticut, have invented new and useful Improvements in Balloon-Valves, of which the following is a specification.

This invention relates to improvements in balloon valves of the maneuvering, safety and other similar types, the primary object of the invention being to provide a valve which can be adjusted or regulated to insure its correct seating or to vary its sensitiveness of action without its removal and also without loss of gas from the balloon.

A further object of the invention is to provide a valve which, by slight variations of construction or arrangement of its component parts, is adaptable for use as a maneuvering or safety valve.

A still further object of the invention is to provide a valve having closing springs arranged to secure accurate seating of the valve and to be adjusted in an easy and convenient manner to regulate their valve closing action.

A still further object of the invention is to provide a valve which may be easily repaired and kept in working order, and which embodies parts capable of interchangeable use with different sized fittings for efficient standardization in the production of valves of different sizes.

With these and other objects in view, the invention consists of the features of construction, combination and arrangement of parts hereinafter fully described and claimed, reference being had to the accompanying drawings, in which:—

Figure 1 is a fragmentary top plan view of a balloon valve constructed in accordance with my invention.

Fig. 2 is a vertical section through the valve as adapted for use as a maneuvering valve.

Fig. 3 is a similar view of the valve as adapted for use as a safety valve.

Fig. 4 is a central vertical transverse section through one of the spring boxes or valve closing devices.

Fig. 5 is a vertical section on the line 5—5 of Fig. 4.

Fig. 6 is a view in elevation of one of the spring boxes or valve closing devices.

Fig. 7 is a vertical section on the line 7—7 of Fig. 4.

In the practical embodiment of my invention I provide a balloon valve comprising an annular frame member or frame ring 1 and an annular valve member or valve ring 2. The frame member or ring 1 is disposed upon one side of the balloon fabric 3 in line with the vent opening formed therein, and is clamped to the balloon fabric by a clamping ring 4 arranged on the opposite side of the fabric, suitable fastenings 5, such as bolts provided with wing nuts, being provided to connect and clamp the parts securely together. In addition to these fastening elements, cement or other fastening means may be employed to effect a fluid tight connection.

The valve member or ring 2 is of smaller diameter than the frame member or ring and, for convenience of construction and lightness in weight, is preferably made of the form described, the space or opening bounded thereby being covered by a fluid tight diaphragm 6 of fabric, thin sheet metal or other suitable material, clamped against one side of the valve ring by a clamping ring 7, through which valve, diaphragm and clamping ring pass fastening bolts or members 8, firmly uniting the parts. Cement or other suitable binding or joint closing means may be used between the surfaces of the valve, diaphragm and clamping ring to make a fluid tight joint, if found necessary or desired. The frame ring is rabbeted or recessed, as shown at 9, to receive a gasket or seat ring 10, and the valve member or ring is also recessed, as shown at 11, to receive a packing ring 12, which packing ring is designed, when the valve is in closed position, to engage the gasket or seat ring and thus seal the gas outlet against the escape of gas. The seat ring may be made of angular form in cross section so as to present a reduced edge to engage the gasket, thus enabling a secure fluid tight seal to be obtained.

In the form of valve shown in Fig. 2 as employed as a maneuvering valve, the fastening members 8 may be provided with eyes 13 for the attachment of the controlling cords, or other suitable means for the attachment of a controlling rope or line may be used.

For the purpose of normally and automatically holding the valve closed, a series of valve closing devices 14 is employed for coöperation with valve closing wires or cords 15. When the valve is constructed and arranged for use as a maneuvering valve, as shown in Fig. 2, the valve member 2 is positioned beneath or on the inner side of the frame member 1, and the said cords or wires 15 are extended through guides 16 on the frame ring and have their free end portions suitably anchored in or fastened to the valve member 2, so that under the action of the closing devices the valve will be normally drawn upward and held against its seat. In the form of the valve shown in Fig. 3, wherein it is illustrated as adapted for use as a safety valve, the valve member 2 is positioned upon the outer or upper side of the frame ring and the cords or wires in this instance pass downward through the guides on the valve ring and are suitably anchored in or otherwise fastened to the frame ring. With this construction it will be understood that the valve is adapted to open under a predetermined pressure of the gas within the balloon against the resistance of the valve closing devices, which normally act to force the valve downward against its seat to hold it closed except at such times when the predetermined pressure is exceeded and a venting action is established.

In the form of the invention shown in Fig. 2 the valve closing devices are arranged upon the upper side of the frame ring, while in the form of the invention shown in Fig. 3 the valve closing devices are arranged upon the upper side of the valve ring. Each of these valve closing devices is similar in construction and comprises a box or casing composed of a stationary section 17 and a revoluble section 18. The section 17 is provided with brackets 19 for the passage of suitable fastenings, such as screws 20, to secure each to the frame ring or valve ring, as the case may be, and said sections 18 are open and in communication at their inner or adjacent sides and provided with lapping flanges 21 and 22. The two sections are held united by a transverse shaft 23, which has its ends threaded to receive suitable washers or retaining plates 24 and retaining nuts 25.

Arranged within each casing is a coiled valve closing spring 26 which surrounds the central portion of the shaft 23 and is secured at its inner end thereto, as indicated at 27, the opposite outer end of the spring being suitably fastened to the inner surface of the flange 22 of the casing section 18, as indicated at 28. The shaft is provided with an angular portion 29 on which is mounted the correspondingly shaped hub 30 of a drum or pulley 31, which is thus fixed to turn or revolve with the shaft. This drum or pulley is provided with a grooved periphery 32 around which is wound and suitably secured the adjacent end of the coöperating cord or wire 15, which passes outwardly through a guide opening 33 in the casing section 17.

Normally the spring 26 is wound to a suitable tension to wind up the cord or wire 15 on the pulley 31 and thus serve to hold the valve seated. It will be observed that the spring closing devices are arranged at suitable intervals around the valve structure and connected at similar intervals with the valve, so that provision is made for maintaining the valve accurately closed at all points around the contacting surfaces between the valve and valve ring, whereby a positive and secure closure or seating action is obtained. For the purpose of winding the valve closing springs to any desired tension, to regulate and vary the sensitiveness of action of the valve, suitable means are provided for turning or rotating the revoluble casing section 18 and locking the same in adjusted position or fixed relation to the casing section 17. To this end the casing section 18 is provided at or near its periphery with finger pieces 34 whereby it may be grasped and turned, and the flange 22 of said casing section is formed at fixed intervals with openings or their equivalent 35 to receive a retaining screw or catch 36 upon the flange 21 of the casing section 17. It will therefore be understood that by turning the casing section 18, which will revolve upon the adjacent end of the axle 23, the spring 26 may be tightened or loosened and held under any desired tension by engagement with the screw 36 with one or the other of the series of openings 35.

In the forms shown and any of the forms which the invention may take the spring actuated valve closing devices 14 are arranged upon the exterior of the valve structure, and also upon the exterior of the aerostat, such closing devices being therefore always accessible so that their action may be easily and conveniently regulated to govern or vary the sensitiveness of action of the valve. Such arrangement of the valve closing devices not only provides for their adjustment to regulate the action of the valve, but also enables the springs of said valve closing devices to be adjusted independently of one another and said valve closing devices to be readily repaired, cleaned, replaced or otherwise treated without the necessity of removing the valve and also without any liability of the escape of gas from the balloon, the advantages and conveniences of which in a structure of this character will be obvious.

It will, of course, be understood that the springs of the valves may be of sufficient size and strength for use upon valves of different sizes, and to be adjusted to any degree desired according to the pressure of gas to be retained and conditions under which it is desired to establish a venting action. These spring valve closures may accordingly be made of a suitable size for use upon valve frame rings and valves of different sizes, thus enabling the parts of the valve structures to be standardized throughout a wide range of sizes, with a corresponding reduction of cost in making a large number of valves of different sizes and resulting economy in keeping the valves in proper working order. By the use of standard closing devices of this character, making the use of various sizes of springs unnecessary, greater efficiency of valve action may be secured, as the springs may be to better advantage made of given strength, and the degrees of turning movement of the rotary casing section accurately gaged to wind the springs to a like tension, so that a single turn of the spring will suffice for the entire range of opening movement of the valve, with the result that the tension upon the operating cords or wires will remain uniform throughout the entire movement of the valve, a very desirable feature to secure ease and efficiency in the valve action.

Having fully described my invention, I claim:

1. A balloon valve embodying a valve seat member, a valve member movable with relation thereto, and a series of valve closing devices operatively connected with the valve seat member and valve member at different points, and each including a spring actuated drum, a valve closing cable connected therewith, a rotary valve closing element for winding the drum actuating spring, and means for holding said element in adjusted position.

2. A balloon valve embodying a valve seat member, a valve member movable with relation thereto, and a series of valve closing devices connected at different points with said valve seat member and valve member, each of said devices comprising a spring actuated drum, a valve closing cable connected therewith, and a casing inclosing the drum and including a rotary part, adjustable from the exterior thereof, for winding said spring.

3. A balloon valve embodying a valve seat member, a valve member movable with relation thereto, and a series of valving closing devices connected at different points with the valve seat member and valve member, each of said devices including a spring actuated drum, a casing inclosing the drum and including a fixed section and a rotatable section, said rotatable section being operatively connected with the spring for winding the same to different degrees, and means for connecting said rotatable section of the casing at different points with the fixed section thereof, for holding the spring at different degrees of tension.

4. A balloon valve embodying a valve seat member, a valve member movable with relation thereto, and a series of valve controlling members, each including a drum, a valve closing cable connected with the drum, a coiled spring acting upon the drum to normally move the cable in one direction, a rotary member for winding said spring to different degrees, and means for holding said rotary element in adjusted position.

5. A balloon valve embodying a valve seat member, a valve member movable with relation thereto, and a plurality of valve closing devices arranged at different points about the valve, each including a rotary drum supported by one of said members, a cable connecting the same with the other member, a spring acting upon the drum to wind up the cable, a rotary element for winding up the spring to different degrees, and means for holding said rotary element in adjusted position.

6. A balloon valve embodying a valve seat member, a valve member movable with relation thereto, and a series of valve closing elements, each comprising a casing having a fixed section and a rotary section, a drum within said casing, a cable connected with said drum, a spring within the casing and connected with the movable section of the casing and the drum, means for rotating said movable section of the casing for winding the spring, and means for adjustably connecting the casing sections to hold the rotary casing section in adjusted positions.

7. A balloon valve embodying an annular valve seat member, a valve member, and an annular series of externally arranged valve closing devices, each comprising a casing, a spring actuated drum within each casing, a cable connected with the drum, said casings and cables of the controlling devices being connected with the valve seat member and valve member at points equidistantly around the same, and means coöperating with the casings for tensioning the springs.

8. A balloon valve embodying a valve seat member, a valve member movable with relation thereto, a series of valve closing devices, each including a drum and a casing therefor, cables connected with the drums, a spring within each casing and acting upon the drum, and means forming a component part of the casing for adjusting and regulating the tension of the spring from the exterior of said casing.

9. A balloon valve embodying a valve seat member, a valve member movable with relation thereto, and a series of valve closing devices, each comprising a casing, a rotary drum mounted within the casing, a valve closing cable connected with said drum, a spring within the casing and acting upon the drum for winding the cable thereon for a valve closing action, and rotary means within the casing for winding and tensioning said spring, said means being operative from the exterior of the casing.

In testimony whereof I affix my signature.

CHARLES FREDERICK SMYTH.

Copies of this patent may be obtained for five cents each, by addressing the "Commissioner of Patents, Washington, D. C."